United States Patent [19]

Saitoh et al.

[11] Patent Number: 4,951,275
[45] Date of Patent: Aug. 21, 1990

[54] APPARATUS FOR TRACKING OPTICAL DISK

[75] Inventors: Tadashi Saitoh; Takashi Takeucchi, both of Fujisawa; Masayuki Hirabayashi, Yokohama; Junichi Iida, Yokohama, all of Japan

[73] Assignee: Hitachi, Ltd., Tokyo, Japan

[21] Appl. No.: 184,363

[22] Filed: Apr. 21, 1988

[30] Foreign Application Priority Data

Apr. 24, 1987 [JP] Japan .................. 62-99707

[51] Int. Cl.$^5$ .............................................. G11B 7/00
[52] U.S. Cl. .............................. 369/44.41; 369/44.34
[58] Field of Search ............ 369/44, 46; 250/201 DF, 250/202

[56] References Cited

U.S. PATENT DOCUMENTS

| 4,406,000 | 9/1983 | Shoji et al. | 369/44 |
| 4,414,655 | 11/1983 | Shoji et al. | 369/44 |
| 4,539,665 | 9/1985 | Iso et al. | 369/44 |
| 4,544,872 | 10/1985 | Hirano et al. | 369/46 |
| 4,553,228 | 11/1985 | Gerard et al. | 369/46 |
| 4,561,082 | 12/1985 | Gerard et al. | 369/46 |
| 4,562,564 | 12/1985 | Bricot et al. | 369/46 |
| 4,660,191 | 4/1987 | Maeda et al. | 369/46 |
| 4,707,816 | 11/1987 | Yonezawa et al. | 369/46 |
| 4,712,206 | 12/1987 | Kanda | 369/46 |
| 4,748,609 | 5/1988 | Yonezawa et al. | 369/46 |

Primary Examiner—Donald McElheny, Jr.
Attorney, Agent, or Firm—Antonelli, Terry, Stout & Kraus

[57] ABSTRACT

In an apparatus for tracking an optical disk, readiness in acquiring a steady tracking condition is significant. That is, if the light beam is subjected to feed back while it is positioned in a positive feed back region, e.g., in the middle of adjoining tracks, the track servo system causes an oscillation. Therefore, according to the present invention, the magnitudes of signals from two pits disposed offset from the track and a pit on the track are compared whereby position of the light beam is detected so that the tracking error signal may be cut off when the light beam is positioned in the middle of adjoining tracks.

7 Claims, 4 Drawing Sheets

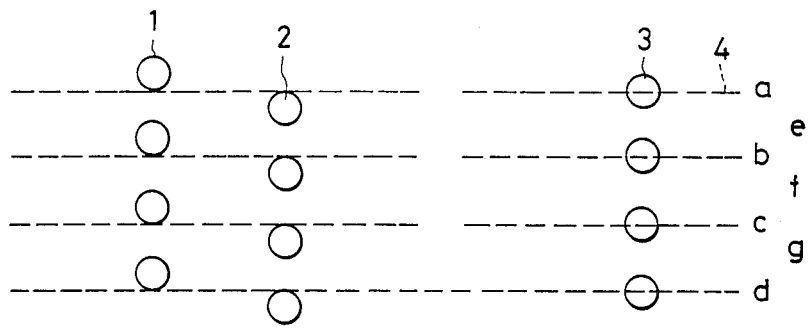
FIG. 1
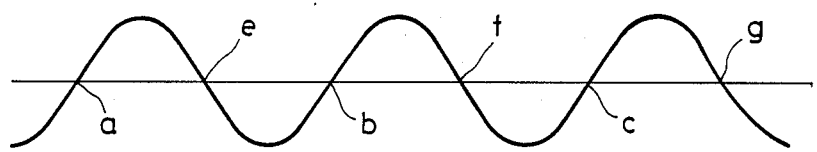
FIG. 2
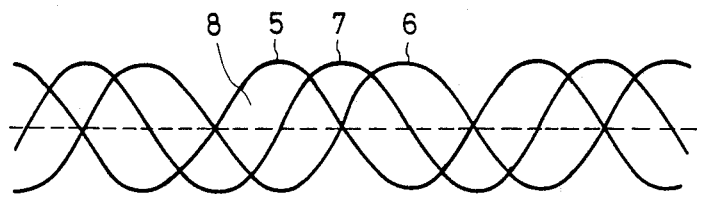
FIG. 3
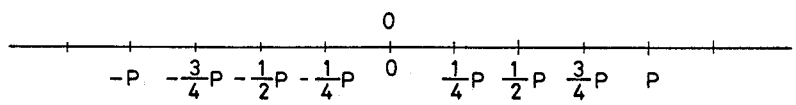

FIG. 4
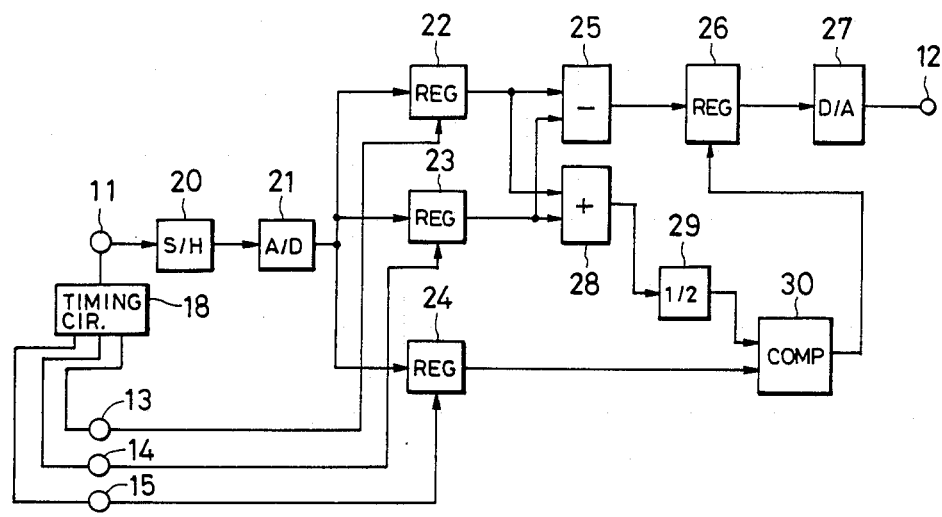
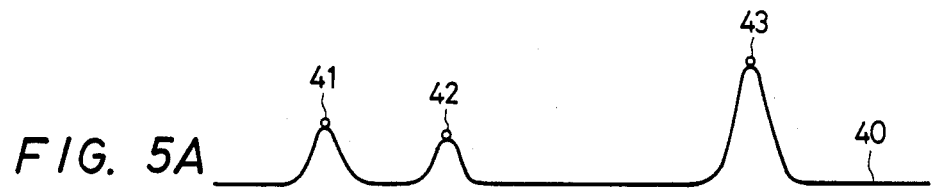
FIG. 5A
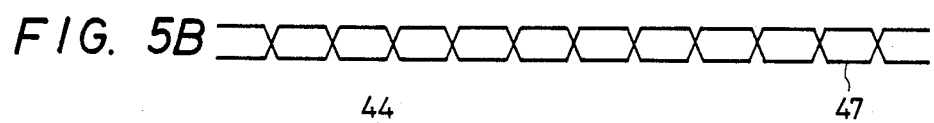
FIG. 5B
FIG. 5C
FIG. 5D
FIG. 5E

APPARATUS FOR TRACKING OPTICAL DISK

BACKGROUND OF THE INVENTION

The present invention relates to an apparatus for tracking an optical disk by means of sampling marks regularly distributed around the track and, more particularly, to an apparatus for tracking an optical disk capable of detecting a positive feedback region for a tracking error signal and thereby achieving steady tracking control.

As a method for tracking an optical disk, one in which reproduced signal are obtained from pits previously formed and distributed around the track at regular intervals wherein a tracking signal is obtained based on the reproduced signals from the pits is known. That is, as described in U.S. Pat. No. 4,562,564, pairs of pits are previously formed along an imaginary center line of the track in a wobbled manner and the tracking error signal is obtained based on the fact that the signal amplitude values obtained from the wobbled pits change according to relative distances between the light beam and the wobbled pits. A similar tracking method is also discussed in a paper published in SPIE, Proceeding, Vol. 695, Optical Mass Data Storage II (1986), pp. 112-115. This method uses sampling marks consisting of three pits as shown in FIG. 1. Referring to the figure, reference numerals 1 and 2 denotes a pair of pits for detecting a tracking error signal, which are offset from the imaginary center 4 of the track to opposite sides by a distance of ¼ of the track pitch. Reference numeral 3 denotes a pit located on the imaginary center of the track for reproducing a clock signal.

The tracking error signal which is generated when a light beam moves across the tracks on an optical disk in its radial direction is made up of the difference between amplitude values of the reproduced signals from the pits 1 and 2. That is, a sinusoidal tracking error signal as shown in FIG. 2 is obtained, wherein points a, b, c represent the center of the track and the points e, f, g represent midpoints of adjoining tracks. At the point a, b, and c, the amplitude values of the signals from the pits 1 and 2 are equal to each other, whereby the tracking error signal becomes zero. Also, at the point e, f, and g, the amplitude values of the signals from the pits 1 and 2 on adjoining tracks become equal to each other, and therefore, an apparently similar tracking error signal to that generated in the center of a track is obtained, but the polarity of the signal is opposite. Hence, it results in a positive feedback for the servo system, and therefore, when the tracking servo system is closed while the light spot is located between tracks, it may occur that the servo oscillates and becomes unable to achieve alignment of the light spot on the track. Thus, a long time may be required for acquireing a steady tracking condition at the time of access.

In the above described prior art, any particular consideration was not given to the problem of such a positive feedback in the tracking servo system. As a result, there was a drawback that a long time was required before acquiring the steady tracking condition.

List of relative prior arts:
U.S. Pat. No. 4,562,564, U.S. Pat. No. 4,561,082,
U.S. Pat. No. 4,553,228, U.S. Pat. No. 4,432,083,
U.S. Pat. No. 4,489,406, U.S. Pat. No. 4,435,797,
U.S. Pat. No. 4,402,061, U.S. Pat. No. 4,443,870.

SUMMARY OF THE INVENTION

An object of the present invention is to provide an apparatus capable of detecting the positive feedback region for its tracking servo system and thereby to achieve a steady functioning in the servomechanism.

The aforesaid object is achieved by comparing the amplitude of a reproduced signal from a pit located in the center of the track and the average of the amplitude values of reproduced signals from two pits offset from the track and thereby detecting whether the light beam is positioned on the track or between two tracks.

As the light beam moves across the tracks, the envelopes of the reproduced signals from the pits 1, 2, 3 respectively vary sinusoidally as indicated by 5, 6, 7 in FIG. 3. Here, the abscissa represents the position in track pitches relative to the center of the track, with the center of the track expressed by O and the track pitch by P.

On the track, the amplitude 7 of the pit 3 is larger than the amplitude values 5 and 6 of the other two pits 1, 2, whereas in the middle of the tracks, the former conversely becomes smaller than the latter. The average of the amplitude values 5 and 6 of the pits 1 and 2, when their sizes and forms are equal, becomes virtually constant and also becomes equal to the average of the amplitude values of the pit 3. Therefore, when comparing the amplitude of the pit 3 with the average of the amplitude values of the pits 1 and 2, it is known, if the amplitude of the pit 3 is larger than the latter, that the light beam is positioned within ¼ of the track pitch from the center of the track, whereas if the former is smaller than the latter, that the light beam is positioned within ¼ of the track pitch from the middle of the adjoining tracks. Thus, through comparison of the amplitude values of the reproduced signals from the three pits, it becomes possible to detect the positive feedback region for the tracking servo system and exclude the error signal in that region and only use the signal in the negative feedback region and thereby to achieve a steady tracking condition.

BRIEF DESCRIPTION OF THE DRAWINGS

FIG. 1 is an explanatory diagram of sample marks formed on the track;

FIG. 2 is an explanatory diagram of a tracking error signal;

FIG. 3 is an explanatory diagram of amplitude values of reproduced signals;

FIG. 4 is a circuit block diagram of an embodiment of the present invention;

FIGS. 5A-5E and FIGS. 6A-6D are explanatory diagrams of the embodiment of FIG. 4.

DESCRIPTION OF THE PREFERRED EMBODIMENTS

Figure 6A:
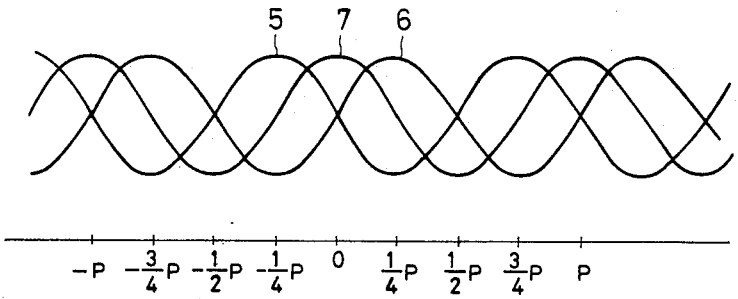

An embodiment of the present invention will be described below. The overall system of the optical disk apparatus consists of an optical disk, laser optical system, and signal processing electronic as shown in FIG. 1 of U.S. Pat. No. 4,562,564 or FIG. 1 or FIG. 3 of U.S. Pat. No. 1,432,083.

The signal processing electronics detect the tracking error signal and adjust the angle of a mirror in a laser optical system so that the light beam may follow the track. When a two-dimensional optical system as disclosed in U.S. Pat. No. 4,702,555 is used, the object lens itself is laterally shifted so that the light beam may follow the track.

Now, an embodiment of a tracking circuit in the signal processing electronics will be described with reference to FIG. 4.

Reference numeral 18 denotes a timing circuit, 20 denotes a sample and hold circuit, 21 denotes an A/D converter, 22, 23, and 24 denote registers, 25 denotes a subtractor, 26 denotes a register, 27 denotes a D/A converter, 28 denotes an adder, 29 denotes a divider, and 30 denotes a comparator. A reproduced signal is input to a terminal 11 and converted into a digital value at a predetermined clock frequency by the sample and hold circuit 20 and A/D converter 21. The timing circuit 18 decodes the reproduced signal and generates timing signals at the timing for the pits 1, 2, 3. As this circuit, the sampling circuit 12 of FIG. 7 of U.S. Pat. No. 4,562,564, for example, is used. From a terminal 13, the timing signal 44 as shown in FIG. 5C is input to the register 22 so that the data of the amplitude value 41 (FIG. 5A) of the first tracking error detecting pit 1 is taken in. Likewise, data of the amplitude values 42, 43 (FIG. 5A) of the pits 2 and 3 are taken into the registers 23, 24 according to the timing signals 45, 46 (FIGS. 5D, 5E) from terminals 14, 15. The signal 47 in FIG. 5B shows the fundamental clock. In the subtractor 25, the difference between the amplitude values of the reproduced signals from the tracking error detecting pits 1 and 2 is calculated whereby a tracking error signal is produced. On the other hand, by means of the adder 28 and divider 29, the value of the sum of the amplitude values 41 and 42 multiplied by $\frac{1}{2}$, namely, the average values, is calculated. The divider 29 is realized in practice by adapting such that the output of the adder 28 is shifted therein by one bit. The comparator 30 compares the aforesaid average value with the amplitude value of the pit 3 is magnitude and outputs the result to the register 26. The register 26, while storing therein the tracking error signal according to the output of the subtractor 25, resets the value to "0" when the amplitude value 43 of the pit 3 is smaller than the aforesaid average value, namely, when the light beam is positioned in the middle of adjoining tracks. The D/A converter 27 converts the thus calculated tracking error signal back to an analog value.

Figure 6B:
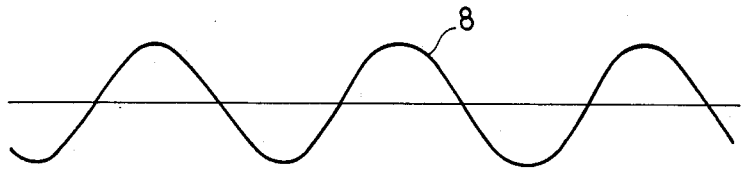
Figure 6C:
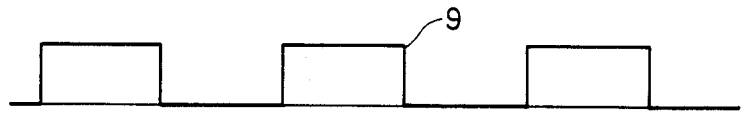
Figure 6D:
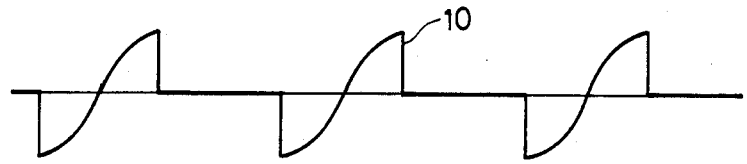

The operation of the embodiment of FIG. 4 will be described again will reference to FIGS. 6A to 6D. When the light beam moves in the direction of the track, the envelopes of the signal amplitude values of the three pits vary as indicated by 5, 6, 7 (FIG. 6A). Therefore, the tracking error signal 8 is detected by the subtractor 25 as the difference signal between the signals 5 and 6 (FIG. 6B). On the other hand, the output 9 of the comparator 30 becomes "1" in the vicinity of the center of the track and becomes "0" in the vicinity of the middle of two tracks (FIG. 6C). Since the value in the register 26 is reset to "0" when the output of the comparator 30 is "0", the tracking error signal ultimately becomes one in which the positive feedback region is removed as indicated by 10 (FIG. 6D).

Since the positive feedback region is correctly detected for exclusion of the error signal in the present embodiment as described above, it becomes possible to quickly acquire a steady tracking condition. And, even if there exists fluctuation or aged deterioration in the reflection factor of the recording film on the optical disk, there is no possibility of malfunction because the detection is made depending upon the relative magnitudes of signal amplitude values between pits located very close to each other.

Figure 7:
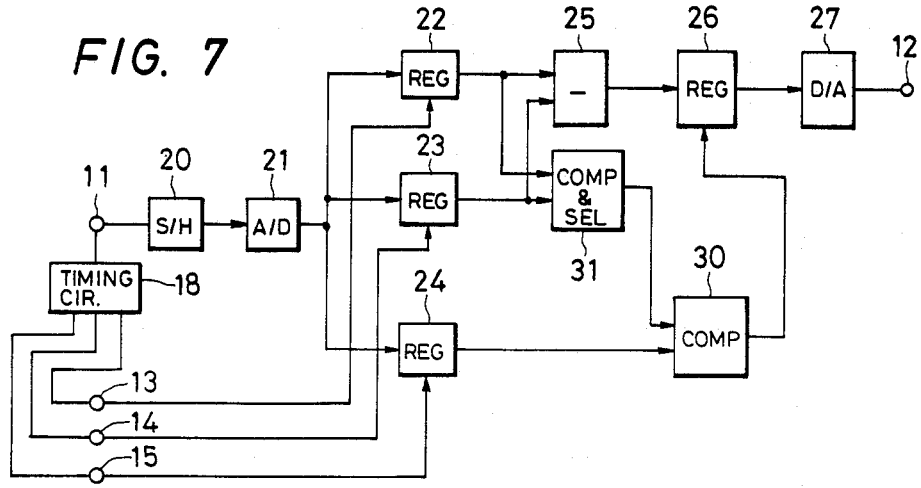
FIG. 7, FIG. 8, and FIG. 9 are circuit block diagrams of other embodiments of the present invention.

Another embodiment of the present invention will be described with reference to FIG. 7, in which the parts performing the same operations as those in FIG. 4 are denoted by corresponding reference numerals. The only difference is a comparator and selector 31. The comparator and selector 31 outputs one of the outputs of the registers 22 and 23 whichever is the larger of the two, for example, or the smaller thereof. Otherwise the operations are the same as in FIG. 4. In the case where the comparator and selector 31 outputs the value of the larger one, as easily found from FIGS. 6A–6D, the tracking error signal is output periodically only at locations within $\pm\frac{1}{8}$ track pitch of the center of the tracks and elsewhere the register 26 is reset and the error signal becomes "0". On the other hand, in the case where the comparator and selector 31 outputs the value of the smaller one, the tracking error signal is likewise output periodically at locations within $\pm\frac{3}{8}$ track pitch of the center of the tracks and the register 26 is reset and the tracking signal becomes "0" at location within $\pm\frac{1}{8}$ track pitch of the middle point of adjoining tracks.

As described above, a required tracking region can always be cut out accurately even when the amplitude values of the reproduced signals are varied, and thus it is made possible to acquire a steady tracking operation. Further, the duty cycle of the tracking region can be made either larger or smaller.

Figure 8:
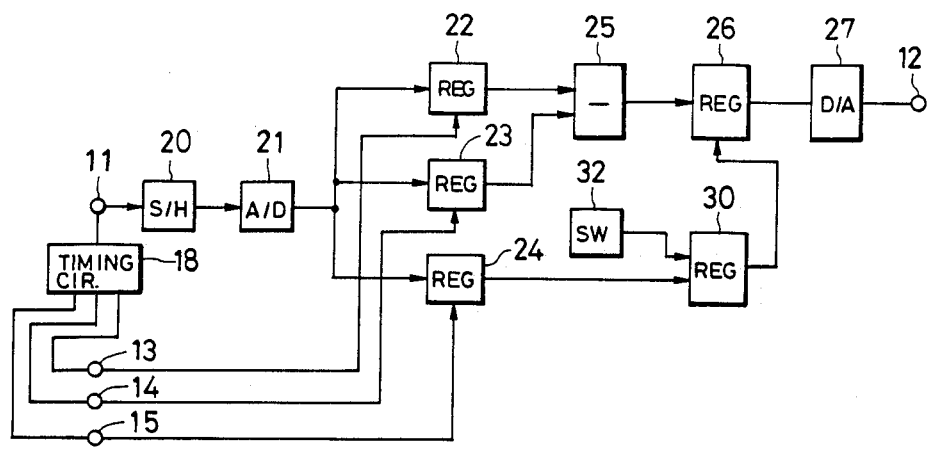

A further embodiment of the present invention as shown in FIG. 8 will be described according to this figure. This embodiment is the same as the embodiment of FIG. 4 except the portion around a switch 32. The switch 32 is provided for establishing the tracking region, that is, by having this switch set to an optional value, the duty cycle of the tracking region can be changed to any value.

Figure 9:
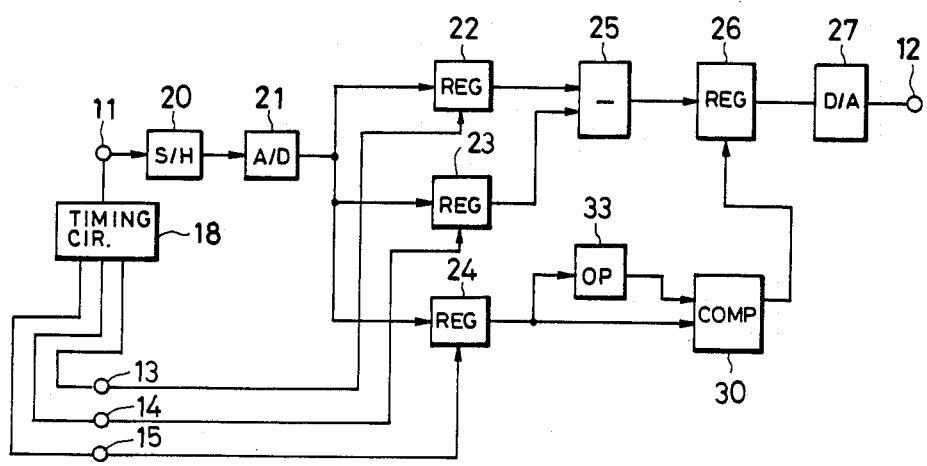

FIG. 9 shows a still further embodiment of the present invention, which is the same as the embodiment of FIG. 4 except the portion around an operational element 33. The operational element 33 makes calculation from the signal amplitude values of the pit 3 and provides, for example, the average of the amplitude values. Then, the comparator outputs "1" only when the amplitude of the pit 3 is larger than its average value, whereby the same as in the foregoing, a positive feedback region can be excluded. As to the signal to be output from the operational element, it is also practicable to arrange such that the maximum and minmum values are stored therein and the average of the two values is output therefrom to obtain similar effect. Since, in this embodiment, only the amplitude values of the pit 3 are used, the positive feedback can be correctly excluded even when the form or size of the pits 1 and 2 are different form those of the pit 3.

The optical disk apparatus according to the present invention, as described so far, is enabled to detect the positive feedback region for its exclusion, even when the optical disk is not yet recorded with any data, according to previously formed pit signals and thereby to acquire a steady tracking condition.

What is claimed is:

1. An apparatus for tracking an optical disk performing tracking according to a tracking error signal detected by use of signals reproduced from previously formed pits at regular intervals on the tracks, wherein said previously formed pits are made up of at least two pits, of which one is slightly offset from the track to one side and the other is slightly offset from the track to the other side, and wherein a third pit is formed on the track, comprising:

means for detecting a difference between a signal amplitude of a signal reproduced from one of said pits and a signal amplitude of a signal reproduced from the other of said pits, said difference signal being used as the tracking error signal for performing tracking control;

means for comparing a signal reproduced from said third pit on the track with a predetermined signal; and means for cutting off said tracking error signal either in the case where said reproduced signal of said third pit is larger than said predetermined signal in amplitude or in the case where conversely said reproduced signal of said third pit is smaller than said predetermined signal in amplitude.

2. An apparatus according to claim 1, wherein said predetermined signal is an output signal from operational means for calculating an average value of the signal amplitude of the signal reproduced from one of said pits and the signal amplitude of the signal reproduced from the other of said pits.

3. An apparatus according to claim 1, wherein said predetermined signal is an output signal from selection means for comparing the signal amplitude of the signal reproduced from one of said pits with the signal amplitude of the signal reproduced from the other of said pits and selecting either one of said signals.

4. An apparatus according to claim 3, wherein the offset amounts of said two previously formed pits are ¼ of the track pitch, and said selection means selects the larger signal of said two reproduced signals.

5. An apparatus according to claim 3, wherein the offset amounts of said two previously formed pits are ¼ of the track pitch, and said selection means selects the smaller signal of said two reproduced signals.

6. An apparatus according to claim 1, wherein said predetermined signal is an output signal from operation means for calculating the average value of a plurality of amplitude values of the reproduced signal from said third pit on the track.

7. An apparatus according to claim 1, wherein the offset amounts of said two previously formed pits are ¼ of the track pitch.

* * * * *